United States Patent
Speth et al.

(10) Patent No.: US 9,974,024 B2
(45) Date of Patent: May 15, 2018

(54) CIRCUIT, INTEGRATED CIRCUIT, RECEIVER, TRANSCEIVER AND METHOD FOR RECEIVING A SIGNAL

(71) Applicant: Intel IP Corporation, Santa Clara, CA (US)

(72) Inventors: Michael Speth, Krefeld (DE); Armin Haeutle, Dachau (DE); Frank Huertgen, Krefeld (DE); Biswajit Dey, Bangalore (IN); Markus Jordan, Gelsenkirchen (DE)

(73) Assignee: Intel IP Corporation, Santa Clara, CA (US)

( * ) Notice: Subject to any disclaimer, the term of this patent is extended or adjusted under 35 U.S.C. 154(b) by 0 days. days.

(21) Appl. No.: 15/077,197

(22) Filed: Mar. 22, 2016

(65) Prior Publication Data

US 2016/0316434 A1 Oct. 27, 2016

(30) Foreign Application Priority Data

Apr. 22, 2015 (DE) .................. 10 2015 106 201

(51) Int. Cl.
*H04W 52/02* (2009.01)
(52) U.S. Cl.
CPC ... *H04W 52/0245* (2013.01); *H04W 52/0229* (2013.01); *Y02B 60/50* (2013.01)
(58) Field of Classification Search
CPC ............. H04W 52/02; H04W 52/0229; H04W 52/0245
USPC ................ 455/574, 343.1–343.5, 522, 245.1
See application file for complete search history.

(56) References Cited

U.S. PATENT DOCUMENTS

| | | | | |
|---|---|---|---|---|
| 5,570,369 A * | 10/1996 | Jokinen | ................... | H04L 1/004 340/7.34 |
| 5,815,507 A * | 9/1998 | Vinggaard | ............ | H03M 13/00 714/704 |
| 8,296,631 B2 * | 10/2012 | Wandel | ................. | H04L 1/0054 714/746 |
| 8,964,615 B2 * | 2/2015 | Sikri | ................. | H04W 52/0229 370/311 |
| 2003/0064696 A1 * | 4/2003 | Akamine | ............. | H03G 3/3052 455/311 |
| 2005/0129150 A1 * | 6/2005 | Terao | ................... | H03G 3/3068 375/345 |
| 2008/0182597 A1 | 7/2008 | Kadada | | |
| 2008/0304432 A1 * | 12/2008 | Lee | ..................... | H04W 52/029 370/311 |

(Continued)

FOREIGN PATENT DOCUMENTS

DE        69839192 T2     2/2009

*Primary Examiner* — Duc M Nguyen
(74) *Attorney, Agent, or Firm* — Eschweiler & Potashnik, LLC

(57) ABSTRACT

A circuit according to an example includes a receiver circuit configured to receive a signal including a data stream, the data stream including at least one block of data, a block of the at least one block of data including at least two sub-blocks, a payload of the block being redundantly encoded in the at least two sub-blocks, and the at least two sub-blocks of the block being consistently arranged over time inside the block. The circuit further includes a control circuit configured to switch the receiver circuit into a non-ready-to-receive state during at least a part of at least one of the at least two sub-blocks of the block, when an enable condition is fulfilled.

4 Claims, 7 Drawing Sheets

(56) References Cited

U.S. PATENT DOCUMENTS

| | | | |
|---|---|---|---|
| 2008/0311947 A1* | 12/2008 | Soerensen | H04L 1/0053 455/522 |
| 2010/0173666 A1* | 7/2010 | Kawagishi | H04W 52/42 455/522 |
| 2011/0158202 A1* | 6/2011 | Ozukturk | H04B 1/707 370/335 |
| 2011/0164513 A1 | 7/2011 | Lecki et al. | |
| 2011/0237290 A1* | 9/2011 | Nishikawa | H04W 52/42 455/522 |
| 2012/0115552 A1* | 5/2012 | Bhattacharya | H04W 52/0261 455/574 |
| 2014/0080537 A1* | 3/2014 | Udupa Sripathi | H04W 52/241 455/522 |

* cited by examiner

CIRCUIT, INTEGRATED CIRCUIT, RECEIVER, TRANSCEIVER AND METHOD FOR RECEIVING A SIGNAL

CROSS REFERENCE TO RELATED APPLICATIONS

This application claims priority to German Application number 102015106201.1, filed on Apr. 22, 2015, the contents of which are herein incorporated by reference in its entirety.

TECHNICAL FIELD

The present disclosure relates to a circuit, an integrated circuit, a receiver, a transceiver, a method for receiving a signal and corresponding software-related implementations.

BACKGROUND

In many applications, power consumption is a critical issue, since it may limit the possibilities of using devices, when no ready-to-use power source like a power line is available. Examples come from all kinds of mobile devices including, for instance, mobile computers, mobile phones and mobile radio equipment. In many of these applications data including speech, audio data or other data are transmitted from a transmitter to a receiver or even exchanged between participating entities. In many of these applications, transmitting and receiving data often causes the energy consumption of the corresponding device to climb.

For instance, in the field of mobile phones, energy consumption may be a critical parameter for the operating time of a mobile phone, since mobile phones typically depend on rechargeable batteries used, which have to be charged or recharged.

While many steps have been taken to limit the necessary power during transmission, energy consumption during receiving signals has not been focused on to the extent of saving energy during transmitting. Therefore, for instance in the field of mobile phones, a challenge exists to further reduce a power consumption. This may prolong an operating time of the mobile phone typically limited by the charge capacity of the batteries used.

However, also in other fields of technology and other applications, similar challenges exist. Apart from the previously-mentioned mobile computers and mobile radio equipment, similar challenges exist, for instance, in applications where signals are at least to be received and where an energy supply may be limited for different reasons. Other examples may come from the automotive area as well as the maritime or the aeronautical field.

SUMMARY

Therefore, a demand exists to reduce an energy consumption when receiving a signal. This demand may be satisfied by a circuit, an integrated circuit, a receiver, a transceiver, a method for receiving a signal, corresponding software-related implementations or an apparatus for receiving a signal according to any of the independent claims.

BRIEF DESCRIPTION OF THE DRAWINGS

Some examples of circuits, apparatuses and/or methods will be described in the following by way of example only. In this context, reference will be made to the accompanying Figures.

DETAILED DESCRIPTION

Figure 1:
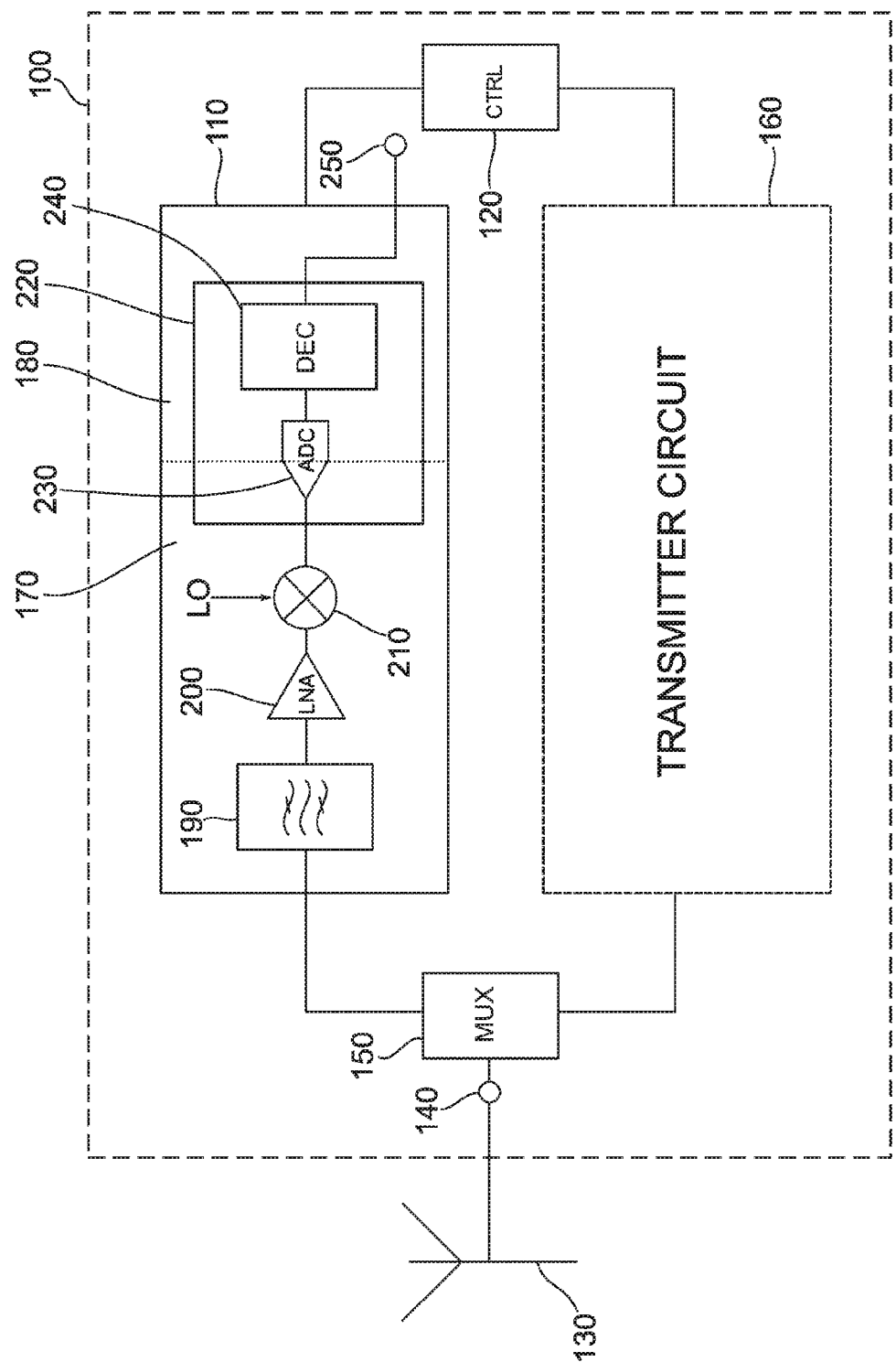
FIG. 1 shows a simplified block diagram of a circuit according to an example.

Various examples will now be described more fully with reference to the accompanying drawings in which some examples are illustrated. In the figures, the thicknesses of lines, layers and/or regions may be exaggerated for clarity.

Accordingly, while examples are capable of various modifications and alternative forms, the illustrative examples in the figures and will herein be described in detail. It should be understood, however, that there is no intent to limit examples to the particular forms disclosed, but on the contrary, examples are to cover all modifications, equivalents, and alternatives falling within the scope of the disclosure. Like numbers refer to like or similar elements throughout the description of the figures. Moreover, summarizing reference signs will be used to refer to more than one structure, element or object or to describe more than one structure, element or object at the same time. Objects, structures and elements referred to by the same, a similar or a summarizing reference sign may be identically implemented. However, one, some or all properties, features and dimensions may also vary from element to element.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular examples only and is not intended to be limiting of examples. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or blocks thereof.

Unless otherwise defined, all terms (including technical and scientific terms) used herein have the same meaning as commonly understood by one of ordinary skill in the art to which examples belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

In many fields of our daily lives, people rely more and more heavily on electric and electronic devices, for instance, to access information, to connect to other people or services. Many of these devices are mobile devices, which can be moved around along with a vehicle such as a car, a ship, a yacht, a plane or the like, or which can be carried around by a person. In these applications, supplying the respective device with energy may be a limiting factor since electrical energy typically cannot be provided on a continuous basis under these circumstances. Mobile devices often require energy storing components, such as batteries or the like. For instance, in mobile computers including tablet computer, as well as other mobile devices such as mobile phones, smartphones, pagers or the like comprise rechargeable batteries. However, the operating time is often limited by the capacity of these rechargeable batteries.

Similarly, in mobile devices for vehicles such as cars, trucks, ships, yachts and planes, apart from rechargeable batteries conventional fuel-driven generators may also be available to provide the mobile devices with energy. Nevertheless, also in these cases the availability of electrical energy may be limited.

Many of these devices furthermore offer the possibility of at least receiving or even exchanging signals comprising data. For instance, smartphones, mobile phones or mobile computers may allow their users to connect to the internet, to access their e-mails, log onto social media or communicate using telephone connections offered by their devices.

While with respect to transmitting signals many steps have been taken to reduce an energy consumption, reducing an energy consumption when receiving such signals has not been extensively focused on. Therefore, a challenge exists to reduce an energy consumption when receiving such signals.

Although in the following examples will be described which come from radio-based wireless communication systems, such as the 3G Rel. 99 mobile phone standards, also in other fields of application examples described below can be used. These examples may allow a way to reduce a power consumption, for instance, during an ongoing 3G Rel. 99 voice call, although the general or basic principal is by far not restricted to 3G Rel. 99 voice calls.

As outlined before, power consumption is an important performance metric in wireless communication. The general rule of thumb is the less, the better. Examples as will be described below may allow a way to reduce a power consumption in such voice calls but also other transmission schemes by switching a receiver circuit into a non-ready-to-receive state for a part of a block of a transmission.

While there are many different ways to reduce a voice call power consumption, ranging from architectural changes, changes in the process, changes in the signaling and so on, examples may allow operating devices within existing standards and may yet allow comparably large energy savings, when the conditions are right.

FIG. 1 shows a schematic block diagram of a circuit 100 comprising the receiver circuit 110 and the control circuit 120. For instance, the control circuit 120 may be implemented as a processor-based control circuit (CTRL) 120. As will be laid out in more detail below, the receiver circuit may be designed to receive a signal comprising a data stream which comprises at least one block of data. Such a block may comprise at least two sub-blocks, in which a payload of the block is redundantly encoded. The sub-blocks are typically consistently arranged over time inside the block. In other words, the sub-blocks may be arranged gapless over time inside the block. However, with respect to FIG. 2, the signal as described before will be described in more detail.

The control circuit 120 may be configured or specifically designed to switch the receiver circuit 110 into a non-ready-to-receive state during at least a part of at least one sub-block of the block, when an enable condition is fulfilled. To be able to switch the receiver circuit 110 into the previously-mentioned non-ready-to-receive state, the control circuit 120 may be coupled to the receiver circuit 110 allowing to at least send command signals to the receiver circuit 110.

The signal to be received by the circuit 100 may be a radio signal, for instance a radio signal in a radio cellular network compatible, for instance, to the 3G Rel. 99 standard, which is incorporated herewith. To be able to receive the signal, the circuit 100 may comprise an antenna 130 or may be coupled to an antenna 130 via, for instance, an optional terminal 140 of the circuit 100.

Depending on the implementation, the receiver circuit 110 may be coupled directly to the antenna 130 or, as indicated in FIG. 1, indirectly via the terminal 140 and, for instance, via a multiplexer (MUX) 150 or a similar circuit allowing the antenna 130 not only to be used by the receiver circuit 130 but also by a transmitter circuit 160. The multiplexer 150 may allow an alternating access to the antenna by the receiver circuit 110 and by the transmitter circuit 160, which itself is an optional component. However, instead of a multiplexer 150, a dividing network may be used allowing a simultaneous or concurrent access to the antenna 130 by the receiver circuit 110 and the transmitter circuit 160.

Also the transmitter circuit 160 may be coupled to the control circuit 120 to allow the control circuit 120 to influence or even control the operation of the transmitter circuit 160, for instance, by setting operational parameters or to influence a transmission signal generated by the transmitter circuit 160 in response to a signal provided by the control circuit 120. For instance, as will be laid out in more detail below, the control circuit 120 may generate a power control signal and provide same to the transmitter circuit 160 on the basis of which the transmitter circuit 160 generates a transmission signal, which is then sent via the antenna 130.

Naturally, instead of using a single antenna 130 as depicted in FIG. 1, also a plurality of antennas may be used, for instance, for different frequency bands or frequency resources. For instance, the receiver circuit 110 and the transmitter circuit 160 may be coupled to individual antennas 130 to allow receiving a signal and transmitting a transmission signal over different antennas, respectively.

Although so far the signal to be received has been described as a radio signal, examples of a circuit 100 and other examples are by far not limited to radio-based signals. For instance, also optical or other electromagnetic signals as well as acoustic or ultrasonic signals may be used in the context of the examples. Nevertheless, in the following description, radio signals will be used to explain some examples.

In the case of the signal to be received by the receiver circuit 110, the receiver circuit 110 may comprise an analog part 170 and a digital part 180. The analog part 170 may be configured and, hence, specifically designed, to process the signal at least partially in a radio-frequency domain, while the digital part 180 may be configured to process the signal at least partially in a baseband domain. The baseband domain typically has a lower center frequency than the radio-frequency domain, although a bandwidth of the signal in the radio-frequency domain and in the baseband domain may be equal. However, due to the processing in the analog part 170 and/or in the digital part 180 a bandwidth of the signal in the radio-frequency domain and in the baseband domain may also be different.

In the example depicted in FIG. 1, the analog part 170 of the receiver circuit 110 is configured to provide the signal in the baseband domain. However, in other examples, the digital part 180 of the receiver circuit 110 may equally well be configured to generate the signal in the baseband domain. For instance, the analog part 170 may provide the signal in an intermediate frequency domain, while the digital part 180 generates the signal in the baseband domain based on the signal in the intermediate frequency domain. However, in the example depicted here, the analog part 170 provides the signal in the baseband domain to the digital part 180.

The analog part 170 may comprise a filter 190 such as a band-pass filter, configured to filter the signal in the radio-frequency domain. An input of the filter 190 may be coupled to the antenna 130. However, instead of a band-pass filter as depicted in FIG. 1, also other filters may be used such as a notch filter, a low-pass filter or a high-pass filter to mention just a few.

An output of the filter 190 may be coupled to an input of an amplifier 200, for instance a low-noise amplifier (LNA). The amplifier may be configured to amplify the signal in the radio-frequency domain. Since the amplifier 200 is coupled with its input to an output of the filter 190 in the example depicted in FIG. 1, the amplifier 200 will be used to amplify the filtered signal received via the antenna 130.

An output of the amplifier 200 may then be coupled to a mixer 210 configured to down-mix the signal from the radio-frequency domain to a lower frequency band. As explained before, in the example depicted in FIG. 1, the mixer 210 may be configured to down-mix the amplified and filtered signal from the radio-frequency domain to the baseband domain. In order to allow the mixer 210 to perform this, the mixer 210 may also be provided with a local oscillator (LO) signal, which may be provided by an oscillator not shown in FIG. 1. Such an oscillator may, for instance, be based on a phase-locked-loop (PLL) such as a fractional phase-locked-loop (FPLL).

The receiver circuit 110 may further comprise a baseband circuit 220, which is mainly part of the digital part 180 of the receiver circuit 110. The baseband circuit 220 may comprise an analog-to-digital converter 230 (ADC) which is configured to digitize the signal provided to its input. The signal may be sampled and quantized by the analog-to-digital converter 230 to provide a digital representation of the signal provided to the analog-to-digital converter 230. The baseband circuit 220 may further comprise a decoder (DEC) 240, coupled to an output of the analog-to-digital converter 230 and configured to decode the signal further in the baseband domain. For instance, the decoder 240 may be designed to demodulate the received signal.

The receiver circuit 110 may also be configured to generate a payload signal indicating the payload of the block received by the receiver circuit 110. The receiver circuit 110 may comprise a terminal 250 coupled to the receiver circuit 110, for instance, coupled to the baseband circuit 220 or, for example, to the decoder 240 at which the payload signal may be obtainable and can further be processed by other parts of the circuit 100 or other components of a system comprising the circuit 100. For instance, the circuit 100 may be used in the mobile unit, which is also referred to as user equipment (UE), of a radio cellular network. For instance, the radio cellular network may be compatible with the 3G Rel. 99 standard (3G Release 1999).

As described before, the control circuit 120 of the circuit 100 can switch the receiver circuit 110 into a non-ready-to-receive state during at least one of the sub-blocks of the block, when the previously-mentioned enable condition is fulfilled. A power consumption of the circuit 100 in the non-ready-to-receive state may be lower than in a ready-to-receive state, in which the circuit 100 is configured to receive a sub-block of the block and to decode the payload of the block based on the at least one received sub-block. To reduce the energy consumption of the circuit 100 in the non-ready-to-receive state, the receiver circuit may switch at least one component of the analog part 170 of the receiver circuit 110 into stand-by or off. For instance, the at least one component may be the filter 190, the amplifier 200 or the mixer 210 as previously mentioned.

However, to allow the circuit 100 and the receiver circuit 110 to receive a further block or another sub-block of the same block, the at least one component, which is switchable to stand-by or to off, may be such a component to be switchable into a full mode of operation used during the ready-to-receive state in less than a transmission duration of a sub-block of the corresponding block. For instance, the at least one component may be switchable from stand-by or off into the full mode of operation in less than 10% or even in less than 20% of the transmission time of the sub-block.

Similarly, the receiver circuit 110 may be configured to switch at least one component of the digital part 180 of the receiver circuit into stand-by or off in the non-ready-to-receive state. For instance, the at least one component of the digital part 180 may be the analog-to-digital converter 230 and/or the decoder 240 of the baseband circuit 220. Similar to the components of the analog part 170, also these components may be switchable from stand-by to off to a corresponding full mode of operation used during the ready-to-receive state in less than a transmission duration of a sub-block of the block, such as less than 10% or even less than 20% of the transmission time of the sub-block.

Figure 2:
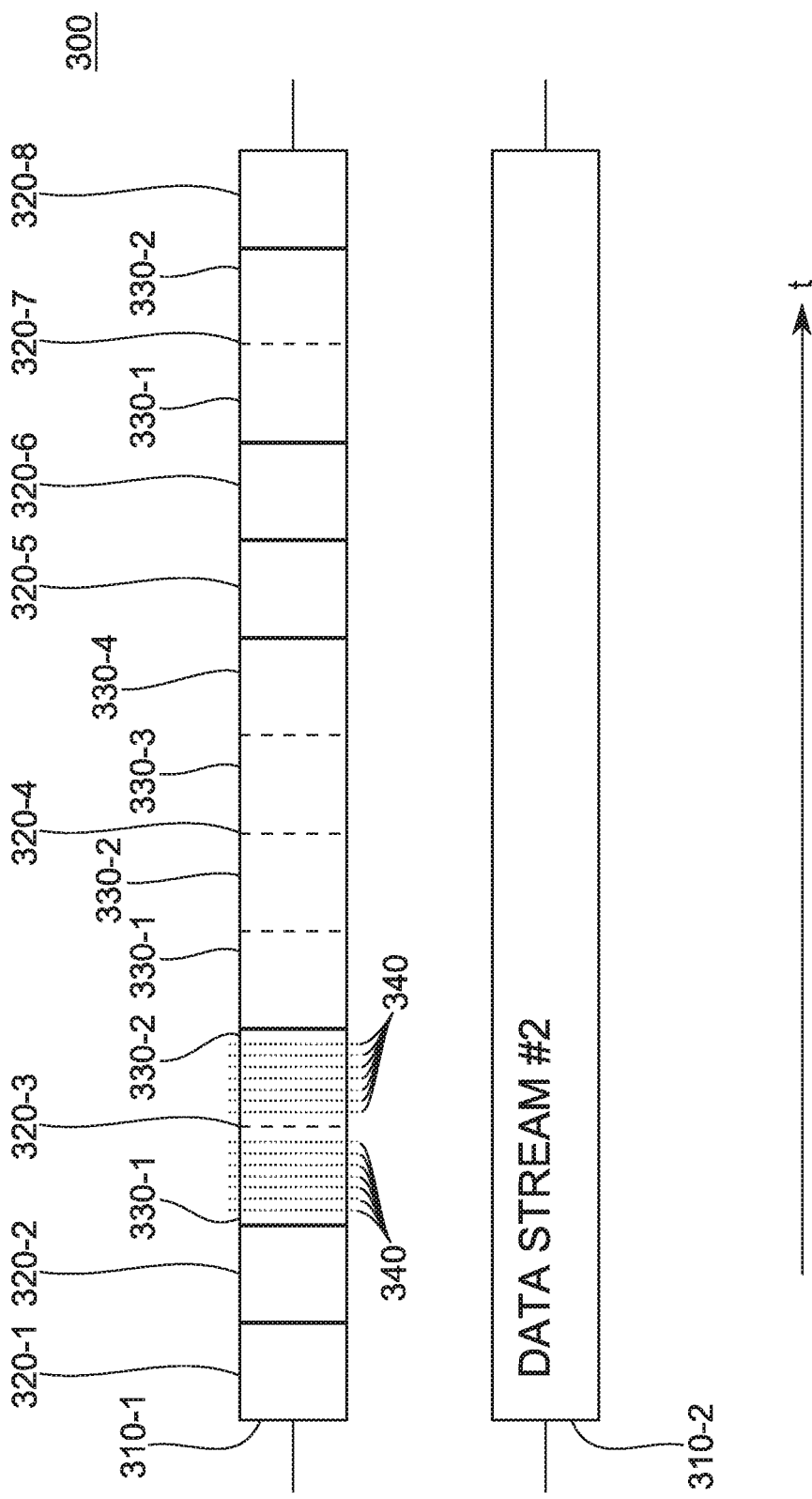
FIG. 2 shows a simplified diagram of a signal.
Figure 3B:
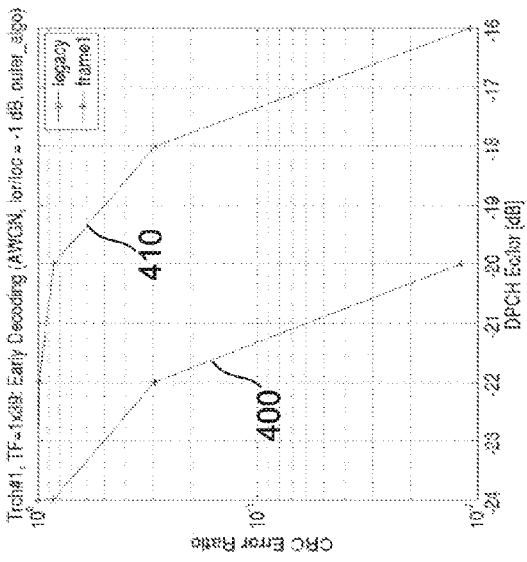
FIGS. 3a to 3d show diagrams of AMR 12.2 transmissions on a DPCH illustrating a CRC error ratio as a function of a signal quality according to the 3G Rel. 99 protocol and according to an example.
Figure 3D:
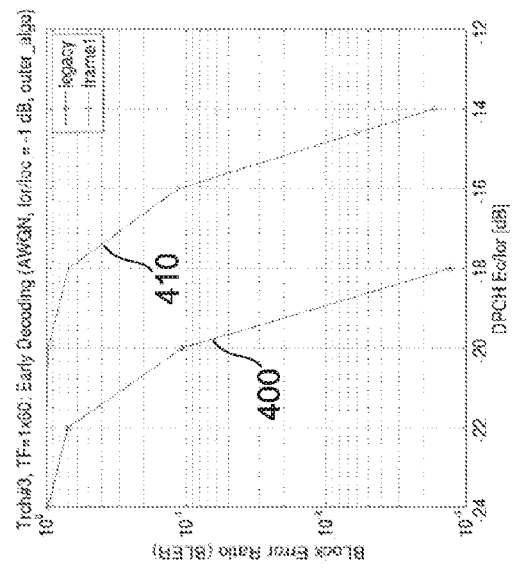
Figure 3A:
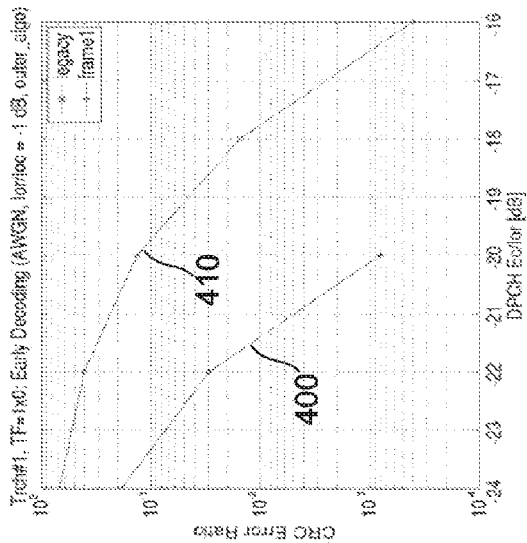
Figure 3C:
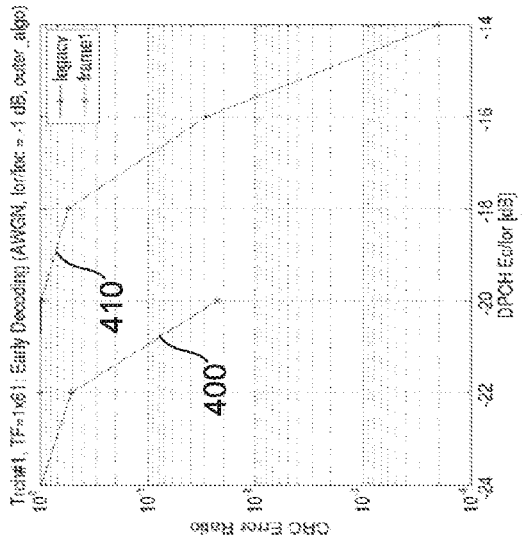

FIG. 2 shows a simplified block diagram of a signal 300 to be received by the circuit 100 as depicted in FIG. 1. As mentioned before, the signal comprises one or more data streams 310 which may correspond to a channel in some wireless communication protocols or techniques. Each of the data streams 310 may comprise at least one block 320 of data, which in turn may comprise one or more sub-blocks 330.

In the example depicted in FIG. 2, the signal 300 comprises at least two data streams 310-1, 310-2, which may be allocated to different users, different services and/or different purposes, for instance, in a cellular network. FIG. 2 shows a representation of the signal 300 over time. As a consequence, since the different data streams may be allocated to different users, different services and/or different purposes, the signal 300 is a non-time-multiplexed signal. For instance, the signal 300 may be a WCDMA (wideband code division multiple access) signal used, for instance, in the 3G mobile communication standard (UMTS; universal mobile telecommunication system) or FDMA-based (frequency division multiple access) modulation schemes such as OFDMA (orthogonal frequency division multiple access) and SC-FDMA (single carrier FDMA) schemes used in the 4th generation mobile communication protocols, such as LTE (long-term evolution) to name just a few examples.

To describe the signal 300 in more detail, the data stream 310-1 illustrate a data stream 310 with a plurality of blocks 320-1, . . . , 320-8. At least one of the blocks 320 comprises a plurality of sub-blocks 330. To be a little more specific, in the example depicted in FIG. 2, the blocks 320-1, 320-2,

320-5, 320-6 and 320-8 each comprise only a single sub-block 330, which has not been labeled with a corresponding sub-block for the sake of simplicity only. However, block 320-3 as well as block 320-7 each comprise two sub-blocks 330-1 and 330-2, while block 320 comprises four sub-blocks 330-1, ..., 330-4. For instance, the blocks 320-3 and 320-7 may comprise AMR (Adaptive Multi-Rate audio codec) data. Similarly, in the case of a block of data transmitted on a dedicated physical channel (DPCH), each of the blocks 320 may comprise two sub-blocks 330 or two frames.

For instance, in the case of the signal 300 being in compliance with the 3G Rel. 99 standard (UMTS, Release 1999), the blocks 320 are also referred to as TTI (transmit time interval), which corresponds to one block of data, and the sub-blocks 330 are also referred to as frames. For instance, in the case of a signaling radio bearer (SRB), each block 320 comprises four sub-blocks 330 or, in other words, four frames. Similarly, in the case of a block of data transmitted on a dedicated physical channel (DPCH), each of the blocks 320 comprises two sub-blocks or two frames.

Each of the blocks 320 comprises a payload, which may be redundantly encoded in the case the corresponding block 330 comprises at least two sub-blocks 330. For instance, the payload of such a block 320 may correspond to at least one block of data concerning a speech transmission, an audio transmission, configuration data for the transmission or other data transmissions. By redundantly encoding the payload of the block 320 in at least two sub-blocks 330, the payload may be decodable from a lower number of sub-blocks 330 than the block 320 comprises. The payload may comprise or even consist of digital data. Hence, in the signal 300 the payload may be digitally encoded. In yet other words, the data stream 310 may be a digitally-encoded data stream 310. Hence, also the signal 300 may eventually be considered a digital or digitally-encoded signal.

Due to the structure of the signal as depicted in FIG. 2, a way to reduce the power consumption when receiving such a signal 300, for instance, in a 3G Rel. 99 voice call, may be by switching the receiver circuit 110 into a non-ready-to-receive state during at least a part of at least one sub-block of the block 320. For instance, in the case of a 3G Rel. 99 voice call using the AMR 12.2 codec (AMR=adaptive multi-rate) it may be possible to switch off the receiver circuit 110 for a part of the block 320, if the conditions are right. Due to the redundant encoding of the payload in the corresponding sub-blocks 330, the payload may be successfully decoded by the already received part of the block 320. Hence, the circuit 100 may—a little oversimplifying—in short stop listening or receiving, when it has heard enough to obtain the payload.

This previously-mentioned switching off the radio-frequency part of the receiver circuit may comprise only partially switching off the receiver circuit 110. For instance, the previously-mentioned components such as the filter 190, the amplifier 200 or the mixer 210 may be switched off or put into stand-by such that the receiver circuit 110 in this phase is not capable of receiving and decoding sub-blocks 330. Depending on the implementation and the signal quality, it may be possible to switch off the receiver circuit 110 at least partially or to put the receiver circuit 110 at least partially into a corresponding stand-by mode up to 50% of the time or even more depending on the implementation of the redundant encoding. This may represent a large amount of possible power savings, which may be used, for instance to prolong the operating time of a mobile device of a user.

To allow the circuit 100 to receive and decode the payload, the control circuit 120 may be configured to switch the receiver circuit 110 into a ready-to-receive state for at least a minimum number of sub-blocks 330 required to decode the payload of the block 320, when the enable condition is fulfilled. The ready-to-receive state may be a state in which the circuit is configured to receive a sub-block 330 of the block 320 and to decode the block based on the at least one received sub-block 330. Naturally, if the conditions are right, the control circuit 120 may be configured to switch the receiver circuit 110 into the ready-to-receive state during exactly the minimum number of sub-blocks 330 of the block 320 required to decode the payload of the block 320, when the enable condition is fulfilled. The control circuit 120 may further switch the receiver circuit 110 into the non-ready-to-receive state during the rest of the sub-blocks 330 of the block 320 not used to decode the payload of the block 320, when the enable condition is fulfilled. The decoding of the payload of the block 320 may be based on a pre-defined pattern for the at least one sub-block 330 during which the receiver circuit 110 has been switched to the non-ready-to-receive state. The predefined pattern may correspond to a predefined value such as a constant value, for instance zero. However, also any other value may be used.

Before describing the enable condition and some applications in more detail, it should be noted that some wireless communication standards comprise power control feedback loops to allow the transmitter, such as a base station in a cellular mobile network, to adapt its power according to the present reception circumstances and vice-versa. Depending on the standard, both, the uplink from the mobile device to the base station and the downlink from the base station to the mobile device may comprise one or more corresponding power control loops. For instance, a quickly-acting inner power control loop as well as a more slowly acting outer power control loop may be implemented.

For instance, in the case of a quickly-acting inner power control loop, each of the sub-blocks may comprise a pre-defined number of slots 340, which are indicated in FIG. 2 by dotted lines. In each of the slices 340, a power control value may be transmitted indicating to the receiving device, in other words to the mobile device of the user or the base station, a request to adapt the power level of the signal transmitted by the respective device. For instance, in the case of the 3G Rel. 99 compatible protocol, each of the sub-blocks 330 may comprise the opportunity to transmit a power control value, for instance, a single bit, indicating a request to increase or to decrease the signal level by one power step. Such a power step may, for instance, be equal to 1 decibel (dB).

However, in other implementations, it may be possible to transmit at least two corresponding power control values indicating the request to increase or to decrease the transmission power.

Returning to the enable condition as described before, it should be noted that the enable condition may depend in some examples on two different conditions, which have to be both fulfilled in the sense of a logic AND-relation for the enable condition to be fulfilled. First of all, the signal to be received by the circuit 100 may have to fulfill a signal quality condition in terms of its signal quality. When the signal quality of the signal 300 does not meet the signal quality condition, the enable condition is not fulfilled.

The enable condition may also depend on an operational condition. In this case, the enable condition can only be fulfilled when also the operational condition is fulfilled, in the case that both the operational condition and the signal quality condition are implemented. Or, in other words, the enable condition is not fulfilled when the operational condition is not fulfilled.

In other examples, only one of the two conditions mentioned before may be implemented at the signal quality condition may be equal to the enable condition or the operational condition may be equal to the enable condition. However, in the following description, the examples are typically based on both, the signal quality condition and the operational condition being implemented.

Before describing some examples in more detail, a broader overview of the signal quality condition will be presented first. For instance, the signal quality condition can be met, when an error rate concerning the payload of the block, when receiving all sub-blocks 330 of the block 320, is at least equal to or comparable with an error rate concerning the payload of the block 330, when the receiver circuit 110 is switched to the non-ready-to-receive state for at least a part of at least one sub-block 330 or for at least one sub-block 330. As will be described in more detail below, the signal quality condition may, for instance, be met, when the signal quality is at least 1 dB better than the signal quality specified for a predetermined error rate, when all sub-blocks 330 of the block 320 are received. Depending on the number of sub-blocks 330 in a block 320 and the number of sub-blocks 330 received, the previously-mentioned difference in terms of the signal quality may have to be higher. For instance, when the block 320 comprises exactly two sub-blocks 330, the signal quality condition may be met, when the signal quality is at least 3 dB or at least 4 dB better than the signal quality specified for a predetermined error rate, when all sub-blocks 330 of the block 320 are received. Similarly, when the block 320 comprises exactly four sub-blocks 320, and when the receiver circuit 110 is switched to the ready-to-receive state for exactly two sub-blocks 330, the signal quality condition may be met, when the signal quality is at least 3 dB or at least 4 dB better than a signal quality specified for a pre-determined error rate, when all sub-blocks 330 of the blocks 320 are received.

In other words, in these two examples, the signal quality condition may be met, when the signal quality is at least 3 dB or at least 4 dB better, when the receiver circuit 110 is switched to the ready-to-receive state for half the number of sub-blocks 330 of the block 320, when the block 320 comprises an even number of sub-blocks 330. The ready-to-receive state is in this context once again the state of the receiver circuit, in which the receiver circuit is configured to receive the at least one corresponding sub-block 330 and to decode the payload of the block 320 based on the received sub-blocks 330. In other words, in the two examples mentioned before, the receiver circuit 110 is switched to the non-ready-to-receive state for the other half of the sub-blocks 330 of the block 320.

To illustrate this further, FIGS. 3a to 3d show each for a voice transmission encoded using the AMR 12.2 codec a CRC (cyclic redundancy check) error rate as a function of the signal quality DPCH Ec/Ior in dB. Here, the data stream 310 corresponds to the dedicated physical channel (DPCH). Each of the FIGS. 3a to 3d shows a first curve 400 corresponding to the 3G Rel. 99 standard, which is also referred to as legacy in FIGS. 3a to 3d. The curves 400 therefore show how the CRC error rate changes as a function of the signal quality, when a conventional receiver circuit is used or when a circuit 100 according to an example is used and the enable condition is not fulfilled.

FIGS. 3a to 3d further show a curve 410 which also corresponds to the CRC error rate or the AMR 12.2 transmission over a dedicated physical channel (DPCH) as the data stream 310, when the enable condition is fulfilled and, hence, the receiver circuit 110 is switched into the non-ready-to-receive state for one of the two sub-blocks 330. To be a little more precise, in the examples depicted in FIGS. 3a to 3d, curve 410 always relates to the first sub-block 330-1 or the first frame used to decode the payload of the corresponding block 320.

Figure 4:
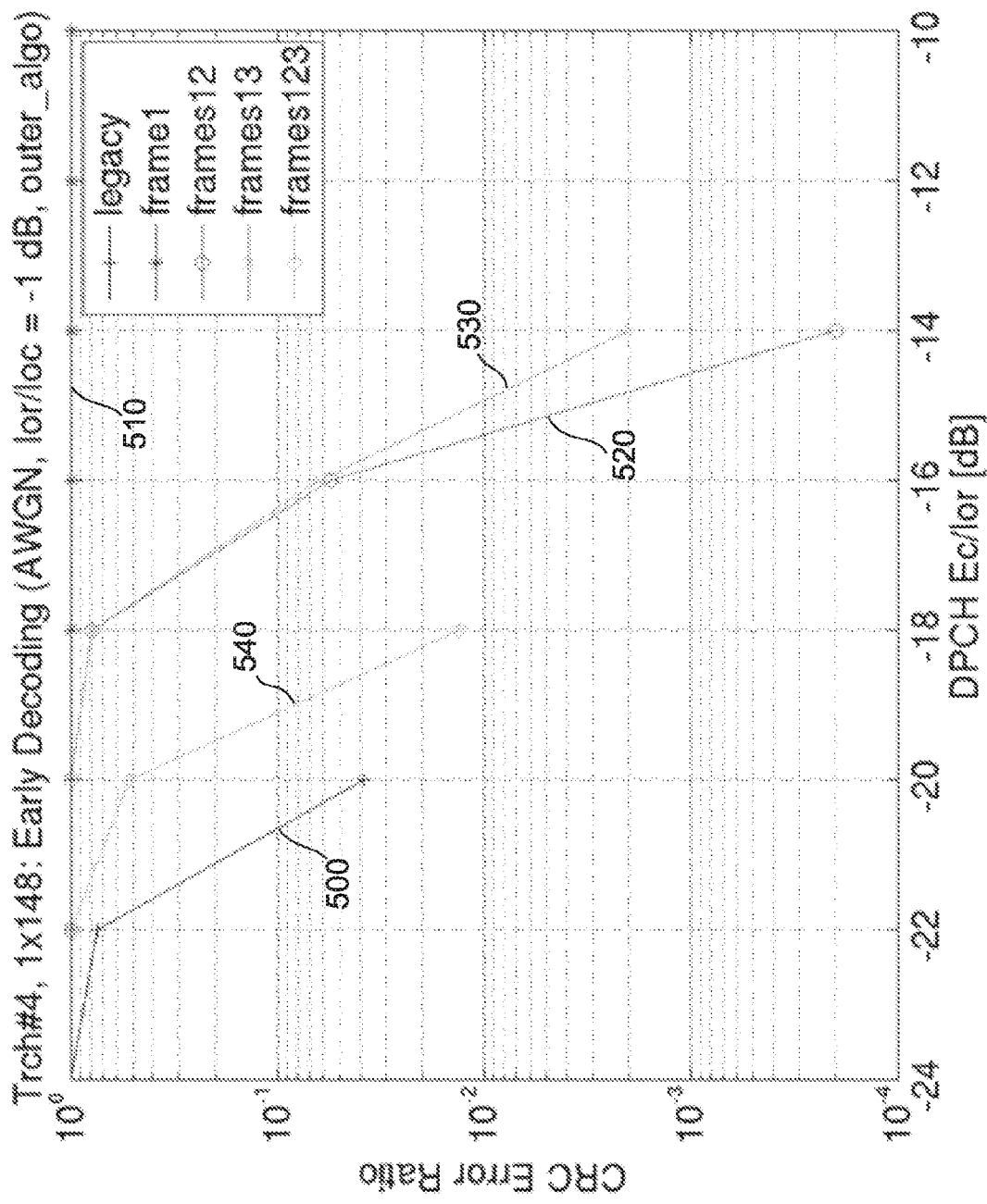
FIG. 4 shows diagrams of SRB transmissions on a DPCH illustrating a CRC error ratio as a function of a signal quality according to the 3G Rel. 99 protocol and according to an example.

For a given CRC error rate, FIGS. 3a to 3d show that the signal-to-interference-and-noise-ratio (SINR) needs to be higher by about 3 to 4 dB, when the receiver circuit 110 is to be switched to the non-ready-to-receive state for one of the two sub-blocks 330 compared to the situation, when the receiver circuit 110 receives all sub-blocks 330 of the block 320. To reach the same or a comparable CRC error rate, the signal quality—here in the form of an SINR should be about 3 to 4 dB higher compared to the situation when all sub-blocks 330 or the block 320 are received. FIGS. 3a to 3d show this for different transport channels used in context with the AMR 12.2 codec. FIG. 4 shows a similar example of a signal transmission, however, based on a signal radio bearer (SRB) transmission, when a block 320 comprises exactly four frames or sub-blocks 330. FIG. 4 once again shows the CRC error rate as a function of the signal quality DPCH Ic/Ior in dB, which may once again be interpreted as a SINR.

To be a little more precise, FIG. 4 shows a CRC error ratio as a function of the signal quality for the situation, when all of the four sub-blocks 330 are received (curve 500) when only a single frame or sub-block 330 is received (curve 510), when the first and second sub-blocks 330 of the block 320 (frames 1 and 2) are received (curve 520), when the first and third frames or sub-blocks 330 of the block 320 are received (curve 530) and when the first, second and third frames or sub-blocks 330 of the block 320 are received (curve 540).

As described before, when half of the sub-blocks 330 are received and during half of the sub-blocks 330 the receiver circuit 110 is switched to the non-ready-to-receive state, a signal quality being about 3 to 4 dB higher or better is required based on the proposed scheme of receiving two out of the four sub-blocks 330 of the SRB in order to obtain a comparable or equal error ratio. In the case of missing only one of a four sub-blocks 330 a signal quality being only about 1 to 2 dB better than the signal quality based on receiving all sub-blocks 330 may be enough to reach the same or a comparable error ratio. However, receiving only a single sub-block 330 will not be enough to decode the payload of the corresponding block 320 as curve 510 clearly illustrates having a CRC error ratio of 1 (=100%).

As a comparison of curves 500 and 540 shows, in the case that the block 320 comprises exactly four sub-blocks 330, and the receiver circuit 110 is switched to the ready-to receive state for exactly three sub-blocks, the signal quality condition may be met, when the signal quality is at least 1 dB or at least 2 dB better than the signal quality specified for a predetermined error rate, when all sub-blocks 330 of the block 320 are received. Here, switching for three sub-blocks 330 to the ready-to-receive state corresponds to switching the non-ready-to-receive state for a single sub-block 330.

However, as FIGS. 3a to 3d and FIG. 4 have shown, by switching the receiver circuit to the non-ready-to-receive state for exactly half the number of sub-blocks 330, when the block 320 comprises an even number of sub-blocks 330, the predetermined error rate may be achieved, when the signal quality is at least about 3 dB or at least about 4 dB better than in the case, when all sub-blocks 330 are received as a comparison of FIGS. 410 and 400 in FIGS. 3a to 3d and a comparison of FIGS. 520, 530 and 500 of FIG. 4 show.

In the examples depicted before, the signal quality was a signal-to-interference-and-noise-ratio (SINR). However, as a further or an alternative signal quality, also a signal-to-noise-ratio (SNR), a signal-to-interference-ratio (SIR), a coherence time, an error rate, a block error rate or any combination thereof can be used. These signal qualities may be applied to the data stream 310 of the signal 300, a pilot signal comprised in the signal 300, a channel corresponding to the data stream 310 of the signal 300, a pilot channel of the signal 300, the block 320 of the data stream 310, a sub-block 330 of the block 320 or any combination thereof.

For instance, in a typical configuration of a 3G Rel. 99 voice call using the AMR 12.2 codec, a block 320 or TTI of 20 ms may be used. This block size corresponds to two UMTS radio frames or, in other words, to two sub-blocks 330. It may further correspond to an effective code rate of less than 50%.

This AMR 12.2 data is carried on the dedicated physical channel (DPCH), which is the dedicated data channel according to the 3G Rel. 99 channel. By numerous simulations as well as experiments, it can be shown as illustrated in the context of FIGS. 3a to 3d, that a successful decoding of such a DPCH may be possible using just one of the two sub-blocks 330 or UMTS radio frames, when the signal-to-noise ratio or a similar signal quality is high enough so that the received radio frame or sub-block is sufficiently error free. The circuit 100 as described in the context of FIG. 1 as well as other examples uses switching off or switching into stand-by the receiver circuit 110 operating in the radio-frequency regime, for instance, when the first sub-block 330-1 of such two sub-blocks 330 comprising block 320 (two-frame TTI) is received, when the corresponding signal quality such as the SINR of the corresponding DPCH at the decoder input of the baseband circuit 220 is high enough. For instance, the decoder may then be fed with the soft bits from the received sub-block 330 and with zeros or other predetermined values for other sub-blocks 330 during which the receiver circuit 110 was shut down or brought into another non-ready-to-receive state.

The same considerations also hold true for the signaling radio bearer (SRB) which also involves decoding the respective payload. However, this is transmitted over a four-frame long TTI or four-sub-block 330 comprising block 320, which corresponds to a transmit time interval of 40 ms. Based on the scheme implemented in the circuit 100 according to an example of switching off, for instance, every second sub-block 330, this channel may be received on, for instance, the first and third sub-blocks 330-1, 330-3 as, for instance, depicted in FIG. 2 with respect to the block 320-4. The decoder 240 of the baseband circuit 220 may be fed with zeros or other default values for the second and fourth sub-block 330-2, 330-4 during which the receiver circuit 110 was switched to the non-ready-to-receive state.

An estimate of the signal quality, for instance, the SINR of the DPCH may be acquired as a bypass product of the 3G Rel. 99 standard. Receivers working according to the 3G Rel. 99 standard or being compatible to the 3G Rel. 99 standard may access an estimate of the signal quality in the form of the SINR since such an estimate may be used in the framework of a downlink power control loop of the WCDMA.

However, apart from the previously-mentioned signal quality condition, an operation condition may also have to be fulfilled to fulfill the enable condition. Thus, the enable condition may eventually not be fulfilled, when the operational condition is not fulfilled.

For instance, in the example depicted above, apart from the AMR 12.2 codec being configured and a sufficiently high SINR, it may be advisable to verify further conditions before switching the receiver circuit 110 into the non-ready-to-receive state so that switching off the radio-frequency part of the receiver circuit 110 or at least parts thereof, is not detrimental. For example, it may be advisable to verify that no cell searches or measurements are configured during this time and also that no RAT (inter radio access technology) activities are ongoing, which may be used when switching between different communication standards. However, the circuit 100 according to an example or other examples are by far not required to implement the AMR 12.2 codec and working on the previously-mentioned channels. However, in many cases it may be advisable to verify the current SINR is, in order to be able to decode the received due to the switching to the non-ready-to-receive state gap blocks 320, correctly. Moreover, it is to be noted that a circuit 100 according to an example may be used in the case of a 3G Rel. 99 implementation in both, TFCI-based (transport format combination indicator) and BTFD-based (blind transport format detection) transmissions.

The operational condition may therefore be not fulfilled, when the circuit 100 operates in a cell search, wherein the circuit 100 is used to perform a measurement concerning at least one of a signal quality and a signal strength of a dedicated channel, when the circuit 100 operates in a HSDPA (high speed downlink packet access) protocol, when the circuit 100 changes a communications protocol or a communications technology, or when the signal 300 is transmitted according to an transmit diversity protocol. In other words, it may be advisable to verify, for instance, if the circuit 100 currently operates in a CLTD (closed-loop transmit diversity) and to avoid switching the receiver circuit 110 to a non-ready-to-receive state in such a case.

In the case of a 3G Rel. 99 implementation, the DPCH in a WCDMA is typically power-controlled. This means that most of the time the SINR of the DPCH is such that it needs exactly the required SINR to reliably decode the DPCH. This may on the other hand mean that the SINR might not be high enough to allow for only a smaller number of sub-blocks 330 to be received and yet allow a reliable decoding. However, situations may occur when such a downlink power control loop is open or the corresponding channels are not power-controlled. As a consequence, in these situations the SINR or a similar signal quality may be high enough such that the previously-described scheme of switching the receiver circuit 110 into the non-ready-to-receive state may be used. An example for such an open power control loop for the DPCH may be the user and his or her mobile device being very close to the corresponding base station. In this case, the required transmit power for reliably decoding may already be very low. If the base station is already transmitting at its minimum DPCH transmit power and the user gets closer to the base station, the base station cannot reduce the DPCH power anymore. As a consequence, the SINR will become higher than actually necessary. In such a situation, the downlink power control loop is open and the SINR may be high enough to enable the scheme described above. The radio-frequency transmitter components and other limiting factors may impose some constraints, which in turn may cause a minimum DPCH transmit power below which the base station cannot transmit the channel with a lower power or signal level.

In other words, the operational condition may be fulfilled, when a power level of the signal cannot be reduced. Moreover, the operational condition may be fulfilled, when the circuit 100 operates in a non-power-controlled-channel or in an open-power downlink control mode of operation. During the time in which the receiver circuit is at least partially switched off or put in a stand-by mode, both uplink and downlink power control loops may not be closed anymore. Similarly, a potential CLTD loop might not be closed. Although it may be advisable to not enable the previously-described scheme in the case that a CLTD mode of operation is present, in order to maintain system stability with risk to the uplink and the downlink power control loops, the following measures may be taken.

For instance, the transmitter power may be influenced. As already described in the context of FIG. 1, the circuit 100 may further comprise the transmitter circuit which is configured to generate a transmit signal to be transmitted to the sender of the signal received or to be received by the receiver circuit 110. In such a case, the control circuit may be configured to determine a signal quality of the signal and to generate a power control signal based on the determined signal quality. The transmitter circuit 160 may then be configured to generated the transmit signal based on the power control signal, which may then be used to close for instance, the downlink power control.

In the case of opening the downlink power control loop by switching the receiver circuit into the non-ready-to-receive state, it may be a viable option to keep the transmit power constant. In other words, the control circuit 120 may be configured to generate the power control signal indicating essentially a constant signal level, when the receiver circuit is switched to the non-ready-to-receive state. In this case, the control circuit may be configured to generate the power control signal during the receiver circuit being switched to the non-ready-to-receive state such that a change of the signal level requested is limited to a predefined power level range. For instance, the control circuit 120 may then generate the power control signal indicating a request to change the power level of the signal to increase or to decrease the power level of the signal by one power step. For instance, by sending the request up, down, up, down, . . . for the downlink power control loop, the control circuit 120 may generate the power control signal to alternatingly request the sender of the signal to increase and to decrease the power level of the signal by one or more power steps. In the example given above, the alternating request to the sender to increase and to decrease the power level is to increase or to decrease the power level by exactly one step, respectively. One power step may correspond to 1 dB of power of the signal.

As explained in the context of FIG. 2, the control circuit 120 may generate the power control signal at least twice per sub-block 330. In the case of the 3G Rel. 99 implementation or a compatible implementation, in the framework of one sub-block 330 fifteen corresponding slots exist such that fifteen corresponding power control values of the power control signal can be sent. The power control signal can be regularly generated per sub-block.

This may limit the impact on the network. Since the power control loop acts on a high rate such as the previously-mentioned 1 dB per slot 340, both the uplink and the downlink power control loops may recover quickly once the receiver circuit 110 is switched to the ready-to-receive state again in the next frame or sub-block 330.

However, even though the impact of the open power control loops might therefore be limited, it may be possible to take additional steps to further mitigate the impact of the open power control loops on the system stability. For instance, the scheme of switching the receiver circuit 110 into the non-ready-to-receive state, may only be activated, if an uplink or downlink radio channel with low dynamics is detected. For instance, in the case of a sub-block with a fully-enabled or ready-to-receive receiver circuit 110 out of the fifteen power control commands or values in either the uplink or downlink direction indicate a total change of the transmit power of less than a certain threshold, for instance, 8 power-up commands and 7 power-down commands or vice-versa, resulting in only a single power-up or power-down command in total per sub-block. In other words, the operational condition may be fulfilled when a change of a power level of the signal is lower than a predetermined power change level.

In such a situation, the channel or data stream 310 may be judged as being sufficiently slowly changing so that opening the power control loop may be regarded as not harmful for the system. Evaluating the dynamics of the channel could also be done by estimating the coherence time of suitable physical channels like, for instance, a common pilot channel (CPICH) on which a known bit sequence at a constant power is transmitted.

Moreover, the operational condition may not be fulfilled, for a predetermined period of time, when an error rate concerning at least one of the data stream 310, the block 320 and the sub-block 330 has risen above a predefined error limit. In other words, the scheme of switching the receiver circuit 110 to the non-ready-to-receive mode may only be active, when, for instance, no block errors in either uplink or downlink directions have been detected in the recent past. If no block errors have been detected, opening the power control loops may not affect the system stability, so that a further enabling of the scheme may be considered as not harmful. If, however, a block error has been detected, it may be advisable not to activate the scheme for a defined period of time.

Moreover, enabling or disabling the scheme of switching the receiver circuit 110 into the non-ready-to-receive state may also be decided on other conditions such as an absolute value of the DPDCH, SINR, ongoing HSDPA transmissions or the like, as previously mentioned. Moreover, the operational condition may not be fulfilled for a predetermined period of time, when a link to the sender of the signal has been established or when a power control algorithm or loop has been established. In other words, it may be advisable not to activate the scheme for an absolute time after a link establishment, the configured power control algorithm being initiated and other examples.

Moreover, the control circuit 120 may be configured to switch the receiver circuit 110 in the non-ready-to-receive state temporarily to the ready-to-receive state in a sub-block 330 to receive an uplink power control value of the sub-block. In this case, the control circuit 110 may further be configured to control a signal level of the transmit signal based on the received power control value. In the case of a 3G Rel. 99 implementation, the control circuit 120 may switch the receiver circuit 110 on again to receive the TPC (transmit power control) bits of the downlink DPCH and use these also for estimating the signal-to-interference-ratio (SIR) of the downlink dedicated physical data channel (DPDCH). By implementing this option, the uplink power control loop may be closed and the mobile device or user equipment (UE) of the user may be able to listen to the uplink power control commands and can react accordingly. Also, the downlink power control loop can be closed if the estimated downlink DPDCH SIR is used to properly generate a downlink TPC command to be sent on the uplink DPCCH.

By implementing this option, it may be possible to close the power control loop. As a consequence, it may be possible to avoid any impact on the system stability. However, this may also mean that the power savings are less than in the previously-described options, since the receiver circuit 110 is switched to the non-ready-to-receive state for a shorter period of time.

By implementing the circuit 100 according to an example it may be possible to realize a power consumption reduction by using a SINR-based, at least partial, receiver circuit 110 shut down at opportunistic times. As outlined before, this may be used in a cellular communication, such as voice calls or the like. A circuit 100 according to an example may be implemented in a high volume architecture such as a computer system architecture, a mobile phone or similar architectures made in high volumes. Such a circuit 100 may be implemented based on integrated devices comprising, for instance, transistors and based on associated manufacturing processes.

In some of the examples depicted above, it may be possible to realize periodic power savings, for instance, every 20 ms for a duration of approximately 10 ms, when the SINR is high enough. Depending on the implementation, the uplink and the downlink power control loops may eventually be not closed. The same may also be true in the case of a CLTD implementation, when the scheme of switching the receiver circuit 110 to the non-ready-to-receive state is nevertheless used in the CLTD mode.

Concerning the power savings, it may be possible to realize a significant drop of energy consumption, when the receiver circuit 110 is switched to the non-ready-to-receive state. However, this may require the SINR or other signal quality indicators to be sufficiently high.

In some situations, using a circuit 100 according to an example may offer a significant improvement concerning the power consumption during, for instance, a 3G Rel. 99 voice call. However, as indicated earlier, examples are by far not limited to the 3G Rel. 99 standard.

Figure 5:
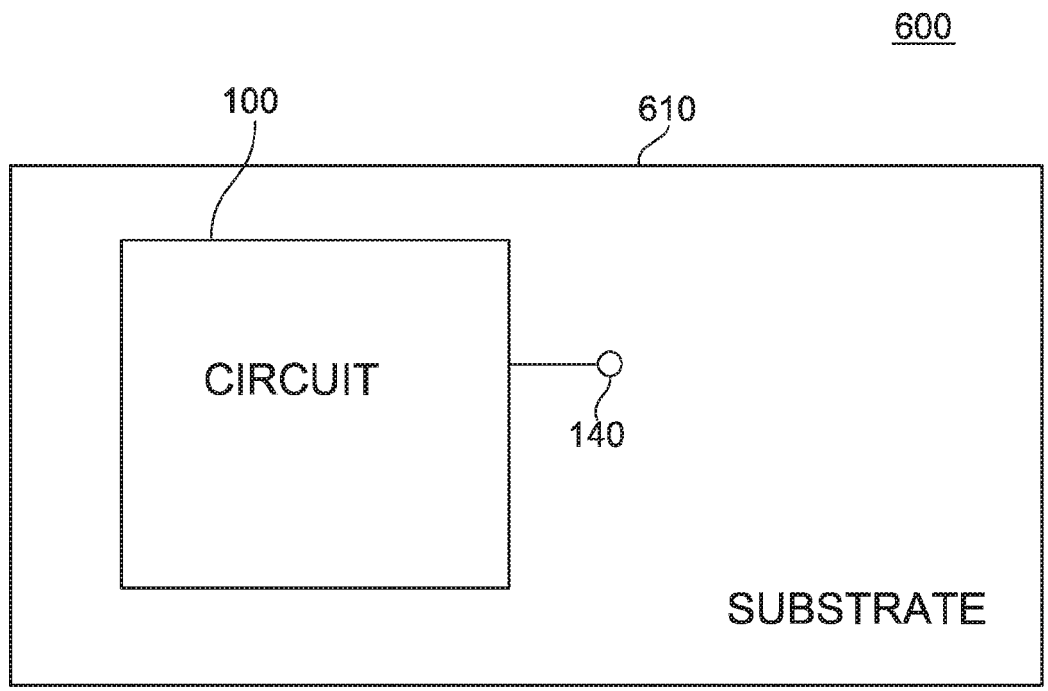
FIG. 5 shows a simplified block diagram of an integrated circuit according to an example.

FIG. 5 shows a simplified block diagram of an integrated circuit 600 comprising a substrate 610, which may be a semiconductor die. The substrate 610 may, for instance, be a flat rectangular-shaped die having a main surface perpendicular to a direction referred to as the thickness of the substrate 610. The thickness of the substrate 610 is typically substantially smaller than the extensions of the substrate 610 along two other linearly-independent directions such as the width and the length of the corresponding substrate 610. For instance, a thickness of the substrate 610 may be at the most ⅕ or 20% of the smallest extension of the substrate parallel to the main surface.

The substrate 610 comprises a circuit 100 according to an example. The integrated circuit may further comprise a terminal 140 configured to couple an antenna 130 (not shown in FIG. 5) to the circuit 100. The terminal 140 may be the terminal of the circuit 100 or may be an additional or alternative terminal.

Figure 6:
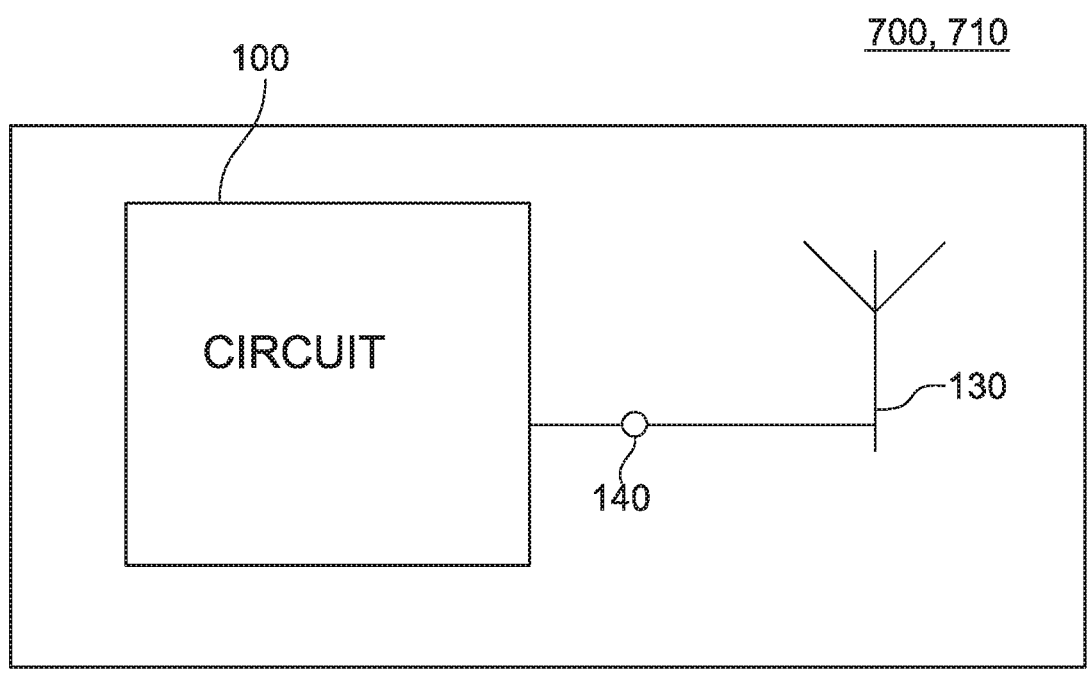
FIG. 6 shows a simplified block diagram of a receiver or a transceiver according to an example.

FIG. 6 shows a schematic block diagram of a receiver 700 or a transceiver 710. The receiver 700 or transceiver 710 comprises a circuit 100 according to an example and may further comprise an antenna 130 coupled to the circuit 100. However, in other examples, the receiver or transceiver may also comprise merely a terminal 140 allowing an antenna 130 to be coupled to the circuit 100 of the receiver 700 or the transceiver 710.

A transceiver is a device capable not only of receiving a signal but also capable of transmitting a signal. For instance, the signal received and the signal to be transmitted may be similar concerning, for instance, specifications according to which the signals are generated and transmitted.

Figure 7:
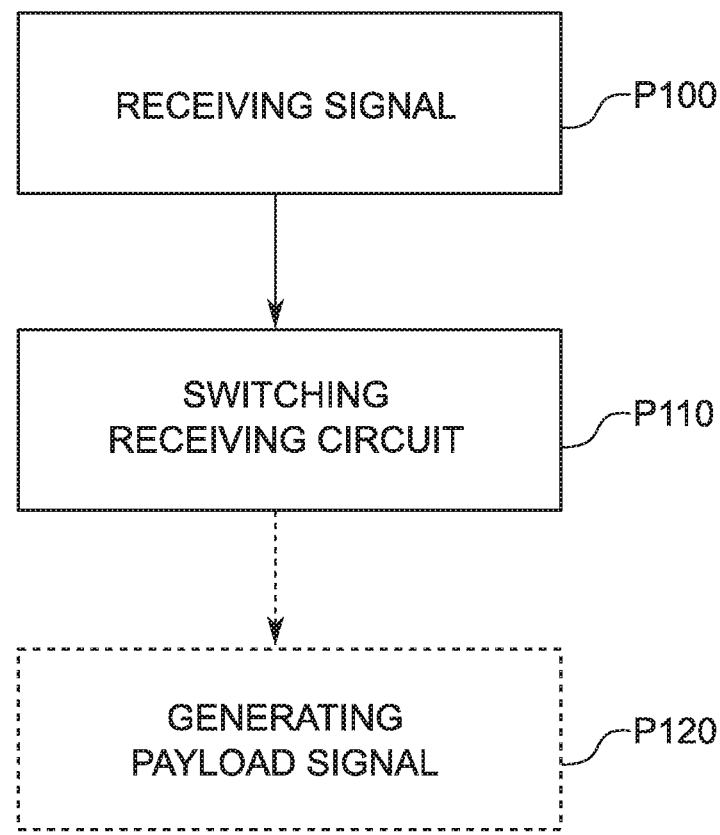
FIG. 7 shows a block diagram of a method for receiving a signal according to an example.

FIG. 7 shows a flowchart of a method for receiving a signal. The method comprises in a process P100 receiving the signal 300 using a receiver circuit 110 as previously described. The signal 300 may also be a signal 300 as described before. The method may further comprise in a process P110 switching the receiver circuit into a non-ready-to-receive state during at least a part of at least one sub-block 330 of the block 320, when an enable condition is fulfilled. Optionally, the method may further comprise generating a payload signal in a process P120 wherein the payload signal indicates the payload of the block 320 of the signal 300.

The processes are by far not required to be performed in the indicated order of FIG. 7. The processes may be performed in an arbitrary order, timely overlapping or even simultaneously. Naturally, the processes may also be performed several times, for instance in the form of a loop.

In the following examples pertain to further examples.

Example 1 is a circuit comprising a receiver circuit configured to receive a signal comprising a data stream, the data stream comprising at least one block of data, a block of the at least one block of data comprising at least two sub-blocks, a payload of the block being redundantly encoded in the at least two sub-blocks, the at least two sub-blocks of the block being consistently arranged over time inside the block. The circuit further comprises a control circuit configured to switch the receiver circuit into a non-ready-to-receive state during at least a part of at least one of the at least two sub-blocks of the block, when an enable condition is fulfilled.

In example 2, the subject matter of example 1 may optionally include a power consumption of the circuit in the non-ready-to-receive state being lower than in a ready-to-receive state, in which the circuit is configured to receive a sub-block of the block and to decode the payload of the block based on the received sub-block.

In example 3, the subject matter of any of the examples 1 or 2 may optionally include the control circuit being configured to switch the receiver circuit into a ready-to-receive state, in which the circuit is configured to receive a sub-block of the block and to decode the payload of the block based on the received sub-block, during at least a minimum number of sub-blocks required to decode the payload of the block, when the enable condition is fulfilled.

In example 4, the subject matter of example 3 may optionally include the control circuit being configured to switch the receiver circuit into the ready-to-receive state during exactly the minimum number of sub-blocks of the block required to decode the payload of the block, when the enable condition is fulfilled.

In example 5, the subject matter of any of the examples 3 or 4 may optionally include the control circuit being configured to switch the receiver circuit into the non-ready-to-receive state during at least a part of each sub-block of the rest of the sub-blocks of the block not used for decoding the payload of the block, when the enable condition is fulfilled.

In example 6, the subject matter of any of the examples 1 to 5 may optionally include the circuit being configured to decode the payload of the block based on a predefined pattern for the at least one sub-block during which the receiver circuit has been switched at least partially to the non-ready-to-receive state.

In example 7, the subject matter of example 6 may optionally include the predefined pattern corresponding to a predefined value.

In example 8, the subject matter of example 7 may optionally include the predefined value being equal to 0.

In example 9, the subject matter of any of the examples 1 to 8 may optionally include the enable condition being not fulfilled, when a signal quality of the signal does not meet a signal quality condition.

In example 10, the subject matter of example 9 may optionally include the signal quality condition being met, when an error rate concerning the payload of the block, when receiving all sub-blocks of the block, is at least equal to or comparable with an error rate concerning the payload of the block, when the receiver circuit is switched during at least a part of at least one sub-block of the block to the non-ready-to-receive state.

In example 11, the subject matter of any of the examples 9 or 10 may optionally include the signal quality condition being met, when the signal quality is at least 1 dB better than a signal quality specified for a predetermined error rate, when all sub-blocks of the block are received.

In example 12, the subject matter of any of the examples 9 to 11 may optionally include the block comprising exactly two sub-blocks, and wherein the signal quality condition is met, when the signal quality is at least 3 dB or at least 4 dB better than a signal quality specified for a predetermined error rate, when all sub-blocks of the block are received.

In example 13, the subject matter of any of the examples 9 to 12 may optionally include the block comprising exactly an even number of sub-blocks, wherein the receiver circuit is switched for at least a part of each sub-block of half of the number of sub-blocks of the block into the non-ready-to-receive state, and wherein the signal quality condition is met, when the signal quality is at least 3 dB or at least 4 dB better than a signal quality specified for a predetermined error rate, when all sub-blocks of the block are received.

In example 14, the subject matter of any of the examples 9 to 13 may optionally include the block comprising exactly four sub-blocks, wherein the receiver circuit is switched for at least a part of exactly one of the sub-blocks of the block into the non-ready-to-receive state, and wherein the signal quality condition is met, when the signal quality is at least 1 dB or at least 2 dB better than a signal quality specified for a predetermined error rate, when all sub-blocks of the block are received.

In example 15, the subject matter of any of the examples 9 to 14 may optionally include the block comprising exactly four sub-blocks, wherein the receiver circuit is switched for at least a part of exactly two sub-blocks of the block into the non-ready-to-receive state, and wherein the signal quality condition is met, when the signal quality is at least 3 dB or at least 4 dB better than a signal quality specified for a predetermined error rate, when all sub-blocks of the block are received.

In example 16, the subject matter of any of the examples 9 to 15 may optionally include the signal quality being at least one of a signal-to-noise-ratio, a signal-to-interference-and-noise-ratio, a signal-to-interference-ratio, a coherence time, an error rate and a block error rate of at least one of a pilot signal comprised in the signal, a channel corresponding to the data stream of the signal, a pilot channel of the signal, the data stream of the signal, the block of the data stream and a sub-block of the block.

In example 17, the subject matter of any of the examples 1 to 16 may optionally include the enable condition being not fulfilled, when an operational condition is not fulfilled.

In example 18, the subject matter of example 17 may optionally include the operational condition being fulfilled, when the circuit operates in a non-power-controlled channel or in an open-power downlink control mode of operation.

In example 19, the subject matter of any of the examples 17 or 18 may optionally include the operational condition being fulfilled, when a power level of the signal cannot be reduced or when a change of a power level of the signal is lower than a predetermined power change level.

In example 20, the subject matter of any of the examples 17 to 19 may optionally include the operational condition being not fulfilled, when the circuit operates in a cell search, when the circuit is used to perform a measurement concerning at least one of a signal quality and a signal strength of a dedicated channel, when the circuit operates in a High Speed Downlink Packet Access protocol, when the circuit changes a communications protocol or a communications technology, or when the signal is transmitted according to a transmit diversity protocol.

In example 21, the subject matter of any of the examples 17 to 20 may optionally include the operational condition being not fulfilled, for a predetermined period of time, when an error rate concerning at least one of the data stream, the block and the sub-block has risen above a predefined error limit, when a link to a sender of the signal has been established, or when a power control algorithm or loop has been established.

In example 22, the subject matter of any of the examples 1 to 21 may optionally include the circuit further comprising a transmitter circuit configured to generate a transmit signal to be transmitted to a sender of the signal.

In example 23, the subject matter of example 22 may optionally include the control circuit being configured to determine a signal quality of the signal and to generate a power control signal based on the determined signal quality, and wherein the transmitter circuit is configured to generate the transmit signal based on the power control signal.

In example 24, the subject matter of example 23 may optionally include the control circuit being configured to generate the power control signal indicating essentially a constant signal level, when the receiver circuit is switched to the non-ready-to-receive state.

In example 25, the subject matter of any of the examples 23 or 24 may optionally include the control circuit being configured to generate the power control signal during the receiver circuit being switched to the non-ready-to-receive state such that a change of the signal level requested is limited to a predefined power level range.

In example 26, the subject matter of any of the examples 23 to 25 may optionally include the control circuit being configured to generate the power control signal indicating a request to the sender of the signal to increase or to decrease the power level of the signal by one power step.

In example 27, the subject matter of example 26 may optionally include the control circuit being configured to generate the power control signal to alternatingly request the sender of the signal to increase and to decrease the power level of the signal by one or more power steps.

In example 28, the subject matter of example 27 may optionally include the power control circuit being configured to generate the power control signal to alternatingly request the sender of the signal to increase and to decrease the power level of the signal by one power step.

In example 29, the subject matter of any of the examples 26 to 28 may optionally include one power step corresponding to 1 dB of the power of the signal.

In example 30, the subject matter of any of the examples 25 to 29 may optionally include the control circuit being configured to generate the power control signal at least twice per sub-block.

In example 31, the subject matter of example 30 may optionally include the control circuit being configured to generate the power control signal regularly per sub-block.

In example 32, the subject matter of any of the examples 22 to 31 may optionally include the control circuit being configured to switch the receiver circuit during a sub-block, during a rest of which the receiver circuit is switched into the non-ready-to-receive state, temporarily to the ready-to-receive state to receive a downlink power control value of the sub-block, wherein the control circuit is further configured to control a signal level of the transmit signal based on the received power control value.

In example 33, the subject matter of any of the examples 22 to 32 may optionally include the control circuit being configured to switch the receiver circuit during a sub-block, during a rest of which the receiver circuit is switched into the non-ready-to-receive state, temporarily to the ready-to-receive state to receive a downlink power control value of the sub-block, wherein the control circuit is further configured to determine a signal quality of the signal based on the received power control value and to generate a power control signal based on the determined signal quality, and wherein the transmitter circuit is configured to generate the transmit signal based on the power control signal.

In example 34, the subject matter of any of the examples 1 to 32 may optionally include the signal being a radio-frequency signal.

In example 35, the subject matter of any of the examples 1 to 34 may optionally include the receiver circuit comprising an analog part configured to process the signal at least partially in a radio-frequency domain and a digital part configured to process the signal at least partially in a baseband domain.

In example 36, the subject matter of example 35 may optionally include the analog part of the receiver circuit being further configured to provide the signal in the baseband domain, or wherein the digital part of the receiver circuit is configured to generate the signal in the baseband domain.

In example 37, the subject matter of any of the examples 35 or 36 may optionally include the receiver circuit being configured to switch at least one component of the analog part of the receiver circuit into stand-by or off in the non-ready-to-receive state.

In example 38, the subject matter of example 37 may optionally include the at least one component switchable to stand-by or to off being configured to be switchable into a full mode of operation used during the ready-to-receive state in less than a transmission duration of a sub-block of the block.

In example 39, the subject matter of example 38 may optionally include the at least one component being switchable from stand-by or off into the full mode of operation in less than 10% of the transmission time of the sub-block.

In example 40, the subject matter of any of the examples 36 to 39 may optionally include the analog part comprising at least one of a filter configured to filter the signal in the radio-frequency domain, an amplifier configured to amplify the signal in the radio-frequency domain, and a mixer configured to down-mix the signal from the radio-frequency domain, and wherein the at least one component comprises at least one of the filter, the amplifier and the mixer.

In example 41, the subject matter of any of the examples 35 to 40 may optionally include the receiver circuit being configured to switch at least one component of the digital part of the receiver circuit into stand-by or off in the non-ready-to-receive state.

In example 42, the subject matter of example 41 may optionally include the at least one component switchable to stand-by or to off being configured to be switchable in to a full mode of operation used during the ready-to-receive state in less than a transmission duration of a sub-block of the block.

In example 43, the subject matter of example 42 may optionally include the at least one component being switchable from stand-by or off into the full mode of operation in less than 10% of the transmission time of the sub-block.

In example 44, the subject matter of any of the examples 41 to 43 may optionally include the digital part comprising at least one of a decoder configured to decode the signal in the baseband domain and an analog-to-digital converter configured to digitize the signal, and wherein the at least one component comprises at least one of the decoder and the analog-to-digital converter.

In example 45, the subject matter of any of the examples 1 to 44 may optionally include the signal being a radio signal.

In example 46, the subject matter of any of the examples 1 to 45 may optionally include the signal being signal in a radio cellular network.

In example 47, the subject matter of any of the examples 1 to 46 may optionally include the signal being a non-time-multiplexed signal.

In example 48, the subject matter of example 47 may optionally include the signal comprising a plurality of data streams, each data stream being allocated to at least one of a different user, a different service and a different purpose.

In example 49, the subject matter of any of the examples 1 to 48 may optionally include the sub-blocks being gapless arranged over time inside the block.

In example 50, the subject matter of any of the examples 1 to 49 may optionally include the payload of the block corresponding to at least one of a speech transmission, an audio transmission, configuration data for the transmission and a data transmission.

In example 51, the subject matter of any of the examples 1 to 50 may optionally include the block of the signal being in compliance with the 3G Rel. 99 standard.

In example 52, the subject matter of example 51 may optionally include the data stream corresponding to at least one of a dedicated physical channel and a signaling radio bearer.

In example 53, the subject matter of any of the examples 1 to 52 may optionally include the circuit being configured for a mobile unit or user equipment of a radio cellular network.

In example 54, the subject matter of examples 53 may optionally include the radio cellular network being compatible with the 3G Rel. 99 standard.

In example 55, the subject matter of any of the examples 1 to 54 may optionally include the payload of the block being redundantly encoded in the at least two sub-blocks such that the payload is decodable from a lower number of sub-blocks than the block comprises.

In example 56, the subject matter of any of the examples 1 to 55 may optionally include the receiver circuit being further configured to generate a payload signal indicating the payload of the block.

In example 57, the subject matter of any of the examples 1 to 56 may optionally include the control circuit being processor-based.

In example 58, the subject matter of any of the examples 1 to 57 may optionally include the payload being digitally encoded in the block of the signal.

Example 59 is an integrated circuit comprising a substrate, the substrate comprising a circuit according to any of the examples 1 to 58.

In example 60, the subject matter of example 59 may optionally include the integrated circuit comprising a terminal configured to couple an antenna to the circuit.

Example 61 is a receiver or a transceiver comprising a circuit according to any of the examples 1 to 58.

In example 62, the subject matter of example 61 may optionally include an antenna coupled to circuit.

In example 63, the subject matter of any of the examples 61 or 62 may optionally include a terminal coupled to the circuit and configured to couple an antenna to the circuit.

Example 64 is a method for receiving a signal, the method comprising receiving the signal, using a receiver circuit, wherein the signal comprises a data stream, the data stream comprising at least one block of data, a block of the at least one block of data comprising at least two sub-blocks, a payload of the block being redundantly encoded in the at least two sub-blocks, the at least two sub-blocks of the block being consistently arranged over time inside the block, and switching the receiver circuit into a non-ready-to-receive state during at least a part of at least one of the at least two sub-block of the block, when an enable condition is fulfilled.

In example 65, the subject matter of example 64 may optionally include generating a payload signal indicating the payload of the block.

In example 66, the subject matter of any of the examples 64 or 65 may optionally include switching the receiver circuit into a ready-to-receive state, in which the circuit is configured to receive a sub-block of the block and to decode the payload of the block based on the received sub-block, during at least a minimum number of sub-blocks required to decode the payload of the block, when the enable condition is fulfilled.

In example 67, the subject matter of example 66 may optionally include switching the receiver circuit comprising switching the receiver circuit into the ready-to-receive state during exactly the minimum number of sub-blocks of the block required to decode the payload of the block, when the enable condition is fulfilled.

In example 68, the subject matter of any of the examples 66 or 67 may optionally include switching the receiver circuit into the non-ready-to-receive state comprising switching the receiver circuit into the non-ready-to-receive state during at least a part of each sub-block of the rest of the sub-blocks of the block not used for decoding the payload of the block, when the enable condition is fulfilled.

In example 69, the subject matter of any of the examples 64 to 68 may optionally include generating a transmit signal to be transmitted to a sender of the signal.

In example 70, the subject matter of example 69 may optionally include determining a signal quality of the signal and generating a power control signal based on the determined signal quality, and wherein generating the transmit signal comprises generating the transmit signal based on the power control signal.

In example 71, the subject matter of example 70 may optionally include generating the power control signal comprising generating the power control signal indicating essentially a constant signal level, when the receiver circuit is switched to the non-ready-to-receive state.

In example 72, the subject matter of any of the examples 70 or 71 may optionally include generating the power control signal comprising generating the power control signal during the receiver circuit being switched to the non-ready-to-receive state such that a change of the signal level requested is limited to a predefined power level range.

In example 73, the subject matter of any of the examples 70 to 72 may optionally include generating the power control signal comprising generating the power control signal indicating a request to the sender of the signal to increase or to decrease the power level of the signal by one power step.

In example 74, the subject matter of example 73 may optionally include generating the power control signal comprising generating the power control signal to alternatingly request the sender of the signal to increase and to decrease the power level of the signal by one or more power steps.

In example 75, the subject matter of any of the examples 72 to 74 may optionally include generating the power control signal comprising generating the power control signal at least twice per sub-block.

In example 76, the subject matter of any of the examples 69 to 75 may optionally include switching the receiver circuit during a sub-block, during a rest of which the receiver circuit is switched into the non-ready-to-receive state, temporarily to the ready-to-receive state to receive a downlink power control value of the sub-block, wherein the method comprises controlling a signal level of the transmit signal based on the received power control value.

In example 77, the subject matter of any of the examples 69 to 76 may optionally include switching the receiver circuit during a sub-block, during a rest of which the receiver circuit is switched into the non-ready-to-receive state, temporarily to the ready-to-receive state to receive a downlink power control value of the sub-block, wherein the method further comprises determining a signal quality of the signal based on the received power control value and generating a power control signal based on the determined signal quality, and wherein generating the transmit signal comprises generating the transmit signal based on the power control signal.

Example 78 is a machine readable storage medium including program code, when executed, to cause a machine to perform the method of any one of examples 64 to 77.

Example 79 is a machine readable storage including machine readable instructions, when executed, to implement a method or realize an apparatus as described in any pending example.

Example 80 is a computer program having a program code for performing any of the methods of examples 64 to 77, when the computer program is executed on a computer or processor.

Example 81 is an apparatus for receiving a signal, the apparatus comprising a means for receiving the signal, the signal comprising a data stream, the data stream comprising at least one block of data, a block of the at least one block of data comprising at least two sub-blocks, a payload of the block being redundantly encoded in the at least two sub-blocks, the at least two sub-blocks of the block being consistently arranged over time inside the block, and a means for switching the means for receiving the signal into a non-ready-to-receive state during at least a part of at least one of the at least two sub-block of the block, when an enable condition is fulfilled.

In example 82 the subject matter of example 81 may optionally include a means for generating a payload signal indicating the payload of the block.

It should be noted that functions, operations, processes and the like described in the context of a circuit, a device or other implementations correspond to appropriate processes of methods. Moreover, functions, operations, processes and the like described in the context of a method can equally well be implemented in a circuit a device or other implementations. Also details concerning applications, signals and other parameters directly or indirectly concerned with an example may also apply to other examples. For instance, a parameter, example or the like described in the context of a device can equally well be implemented in the framework of a method.

Examples may, therefore, provide a computer program having a program code for performing one of the above methods, when the computer program is executed on a computer or processor. A person of skill in the art would readily recognize that steps of various above-described methods may be performed by programmed computers. Herein, some examples are also intended to cover program storage devices, e.g., digital data storage media, which are machine or computer readable and encode machine-executable or computer-executable programs of instructions, wherein the instructions perform some or all of the acts of the above-described methods. The program storage devices may be, e.g., digital memories, magnetic storage media such as magnetic disks and magnetic tapes, hard drives, or optically readable digital data storage media. The examples are also intended to cover computers programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and examples of the disclosure, as well as specific examples thereof, are intended to encompass equivalents thereof.

Functional blocks denoted as "means for . . . " (performing a certain function) shall be understood as functional blocks comprising circuitry that is configured to perform a certain function, respectively. Hence, a "means for s.th." may as well be understood as a "means configured to or suited for s.th.". A means configured to perform a certain function does, hence, not imply that such means necessarily is performing the function (at a given time instant).

Functions of various elements shown in the figures, including any functional blocks labeled as "means", "means for providing a sensor signal", "means for generating a transmit signal.", etc., may be provided through the use of dedicated hardware, such as "a signal provider", "a signal processing unit", "a processor", "a controller", etc. as well as hardware capable of executing software in association with appropriate software. Moreover, any entity described herein as "means", may correspond to or be implemented as "one or more modules", "one or more devices", "one or more units", etc. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the Detailed Description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

Further, it is to be understood that the disclosure of multiple acts or functions disclosed in the specification or claims may not be construed as to be within the specific order. Therefore, the disclosure of multiple acts or functions will not limit these to a particular order unless such acts or functions are not interchangeable for technical reasons. Furthermore, in some examples a single act may include or may be broken into multiple sub acts. Such sub-acts or sub-processes may be included and be part of such a single act or process, unless explicitly excluded.

The invention claimed is:

1. A circuit comprising:
a receiver circuit configured to receive a signal comprising a data stream, the data stream comprising at least one block of data, a block of the at least one block of data comprising at least two sub-blocks, a payload of the block being redundantly encoded in the at least two sub-blocks, and the at least two sub-blocks of the block being consistently arranged over time inside the block; and
a control circuit configured to switch the receiver circuit into a non-ready-to-receive state during at least a part of at least one of the at least two sub-blocks of the block, when an enable condition is fulfilled,
wherein the enable condition is not fulfilled, when an operational condition is not fulfilled, and wherein the operational condition is not fulfilled, for a predetermined period of time, when an error rate concerning at least one of the data stream, the block and the sub-block has risen above a predefined error limit, when a link to a sender of the signal has been established, or when a power control algorithm or loop has been established, and wherein the enable condition is not fulfilled, when an operational condition is not fulfilled, and wherein the operational condition is fulfilled, when the circuit operates in a non-power-controlled channel or in an open-power downlink control mode of operation, or wherein the enable condition is not fulfilled, when an operational condition is not fulfilled, and wherein the operational condition is fulfilled, when a power level of the signal cannot be reduced or when a change of a power level of the signal is lower than a predetermined power change level, or wherein the enable condition is not fulfilled, when an operational condition is not fulfilled, and wherein the operational condition is not fulfilled, when the circuit operates in a cell search, when the circuit is used to perform a measurement concerning at least one of a signal quality and a signal strength of a dedicated channel, when the circuit operates in a High Speed Downlink Packet Access protocol, when the circuit changes a communications protocol or a communications technology, or when the signal is transmitted according to a transmit diversity protocol.

2. A circuit comprising:

a receiver circuit configured to receive a signal comprising a data stream, the data stream comprising at least one block of data, a block of the at least one block of data comprising at least two sub-blocks, a payload of the block being redundantly encoded in the at least two sub-blocks, and the at least two sub-blocks of the block being consistently arranged over time inside the block;

a control circuit configured to switch the receiver circuit into a non-ready-to-receive state during at least a part of at least one of the at least two sub-blocks of the block, when an enable condition is fulfilled; and a transmitter circuit configured to generate a transmit signal to be transmitted to a sender of the signal, wherein the enable condition is not fulfilled, when an operational condition is not fulfilled, and wherein the operational condition is not fulfilled, for a predetermined period of time, when an error rate concerning at least one of the data stream, the block and the sub-block has risen above a predefined error limit, when a link to a sender of the signal has been established, or when a power control algorithm or loop has been established, and wherein the control circuit is configured to determine a signal quality of the signal and to generate a power control signal based on the determined signal quality, and wherein the transmitter circuit is configured to generate the transmit signal based on the power control signal.

3. A circuit comprising:

a receiver circuit configured to receive a signal comprising a data stream, the data stream comprising at least one block of data, a block of the at least one block of data comprising at least two sub-blocks, a payload of the block being redundantly encoded in the at least two sub-blocks, and the at least two sub-blocks of the block being consistently arranged over time inside the block;

a control circuit configured to switch the receiver circuit into a non-ready-to-receive state during at least a part of at least one of the at least two sub-blocks of the block, when an enable condition is fulfilled; and a transmitter circuit configured to generate a transmit signal to be transmitted to a sender of the signal, wherein the enable condition is not fulfilled, when an operational condition is not fulfilled, and wherein the operational condition is not fulfilled, for a predetermined period of time, when an error rate concerning at least one of the data stream, the block and the sub-block has risen above a predefined error limit, when a link to a sender of the signal has been established, or when a power control algorithm or loop has been established, and wherein the control circuit is configured to generate the power control signal during the receiver circuit being switched to the non-ready-to-receive state such that a change of the signal level requested is limited to a predefined power level range, or wherein the control circuit is configured to generate the power control signal indicating a request to the sender of the signal to increase or to decrease the power level of the signal by one power step.

4. A circuit comprising:

a receiver circuit configured to receive a signal comprising a data stream, the data stream comprising at least one block of data, a block of the at least one block of data comprising at least two sub-blocks, a payload of the block being redundantly encoded in the at least two sub-blocks, and the at least two sub-blocks of the block being consistently arranged over time inside the block;

a control circuit configured to switch the receiver circuit into a non-ready-to-receive state during at least a part of at least one of the at least two sub-blocks of the block, when an enable condition is fulfilled; and a transmitter circuit configured to generate a transmit signal to be transmitted to a sender of the signal, wherein the enable condition is not fulfilled, when an operational condition is not fulfilled, and wherein the operational condition is not fulfilled, for a predetermined period of time, when an error rate concerning at least one of the data stream, the block and the sub-block has risen above a predefined error limit, when a link to a sender of the signal has been established, or when a power control algorithm or loop has been established, wherein the control circuit is configured to switch the receiver circuit during a sub-block, during a rest of which the receiver circuit is switched into the non-ready-to-receive state, temporarily to the ready-to-receive state to receive a downlink power control value of the sub-block, wherein the control circuit is further configured to control a signal level of the transmit signal based on the received power control value, or wherein the control circuit is configured to switch the receiver circuit during a sub-block, during a rest of which the receiver circuit is switched into the non-ready-to-receive state, temporarily to the ready-to-receive state to receive a downlink power control value of the sub-block, wherein the control circuit is further configured to determine a signal quality of the signal based on the received power control value and to generate a power control signal based on the determined signal quality, and wherein the transmitter circuit is configured to generate the transmit signal based on the power control signal.

* * * * *